No. 836,627. PATENTED NOV. 20, 1906.
M. F. BROWN.
MEANS FOR SECURING LOGS IN RAFTS.
APPLICATION FILED JAN. 2, 1906.
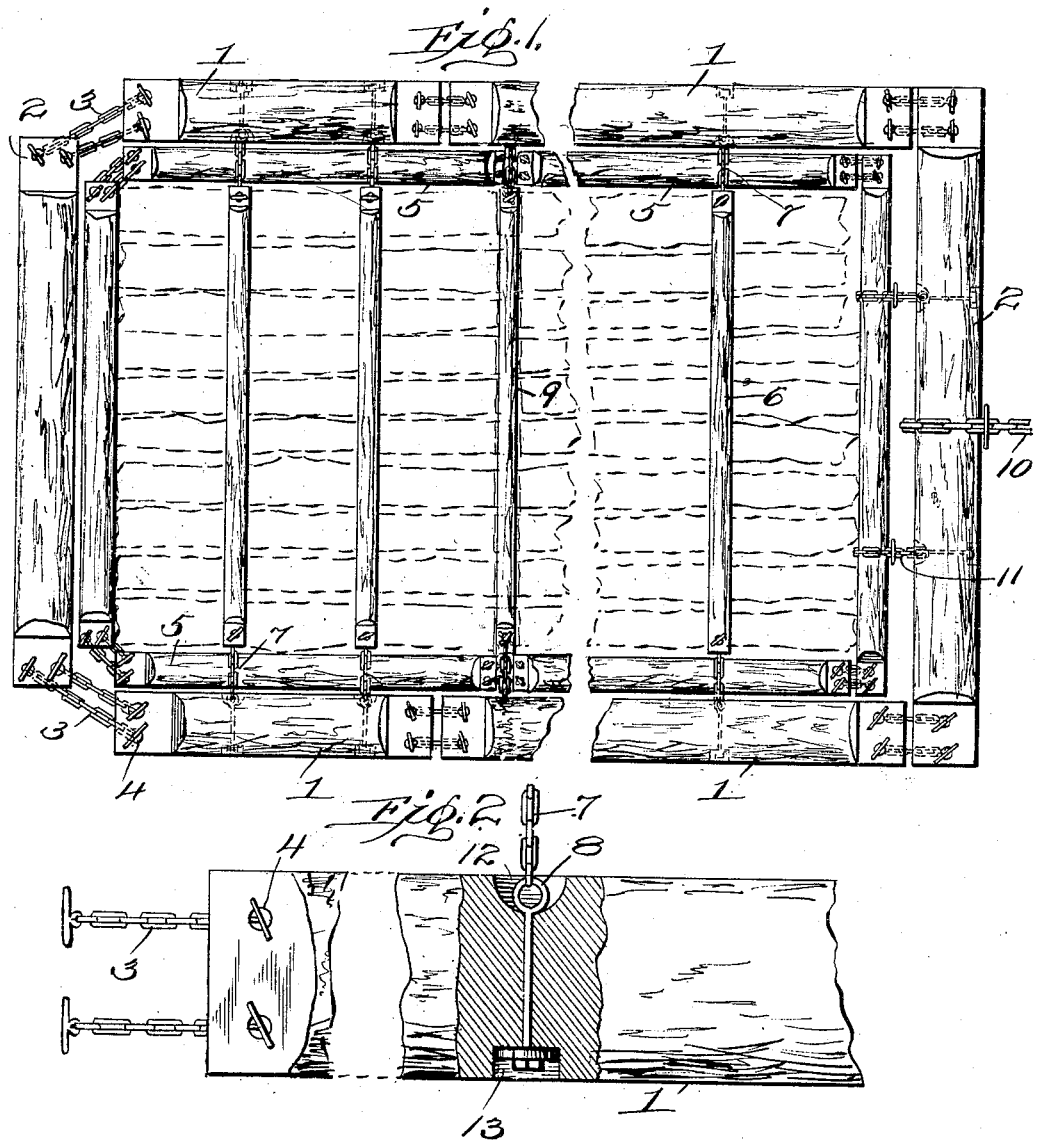
Witnesses
J. M. Fowler Jr.
C. H. Fesler
Inventor
Michael F. Brown,
By Mason, Fenwick & Lawrence
Attorneys

UNITED STATES PATENT OFFICE.

MICHAEL F. BROWN, OF SEATTLE, WASHINGTON.

MEANS FOR SECURING LOGS IN RAFTS.

No. 836,627.    Specification of Letters Patent.    Patented Nov. 20, 1906.

Application filed January 2, 1906. Serial No. 294,221.

*To all whom it may concern:*

Be it known that I, MICHAEL F. BROWN, a citizen of the United States, residing at Seattle, in the county of King and State of Washington, have invented certain new and useful Improvements in Means for Securing Logs in Rafts; and I do hereby declare the following to be a full, clear, and exact description of the invention, such as will enable others skilled in the art to which it appertains to make and use the same.

This invention relates to improvements in raft-securing booms for retaining logs in a raft, and more particularly to means for preventing the logs of the raft from escaping over the surrounding booms of the raft-securing means.

The object in view is the production of a system of booms so secured together as to prevent logs in a raft from escaping.

A further object in view is the production of a system of inner and outer booms so arranged as to resist the tendency of the logs in a raft to break away.

Another object in view is the production of means whereby a raft of loose logs may be separated into sections, and thereby more easily controlled.

With these and other objects in view this invention comprises certain novel combinations, constructions, and arrangements of parts, as will be hereinafter fully described and claimed.

In the accompanying drawings, Figure 1 represents a top plan view of one embodiment of my invention. Fig. 2 is a detail view of one end of one of the booms.

Referring to the drawings by numerals, 1 indicates the side booms, and 2 the end booms. These booms are composed of ordinary logs with squared ends and may be of any desired length. I preferably secure the ends together by means of a chain 3, having the ordinary T 4 secured to each end of the chain. As will be evident from the drawings, it will only be necessary, in order to secure the ends of the booms together, to provide holes in the ends of the boom and then insert a T through the holes in the usual manner. Within the system of booms 1 and 2 I provide another and smaller system of booms, secured in the same manner as booms 1 and 2. I preferably secure the logs 5 5 together approximately midway of one of the logs 1. In this way by securing the logs of the one system of booms at an intermediate point is secured the advantage of having always the resistance of the log or boom at any point along the side of the raft. In rough waters and going over rapids it quite often happens that the ordinary raft is broken in the center by the movement of the logs. By the particular arrangement in which the booms of the present invention are secured it will be practically impossible to break the system of booms on the side. In order to keep the logs from climbing over the booms and escaping from the raft, I provide a number of cross booms or binders 6 6, which are secured to the outer booms 1 1. These cross-binders have a hole provided in their ends and a chain 7 with the ordinary T inserted therethrough. This chain 7 is provided at its other end with an eyebolt 8 of comparatively small diameter. The boom 1 is provided with a hole at the point where the cross-binders are to be placed, and the eyebolt is secured in such hole, as will be clearly seen in Fig. 2. From this construction it will be evident that it will only be necessary to provide a very small hole in the boom 1 in order to accommodate an eyebolt of sufficient strength to equal a chain of considerable strength. In this manner the cross-binders 6 may be secured to the booms 1 1 without materially weakening the said booms. In order to secure the best results, I preferably place the cross-binders 6 on top of the logs and pass the chain 7 over the inner system of booms 5 and then through the eyebolt 8. By thus securing the cross-binders on top of the logs they will be kept in place and prevented from climbing over the booms and being lost. In order to secure better control over large rafts, I provide the inner system of booms with any suitable number of partition-booms 9. These booms 9 are secured to the connecting-chains of the booms 5 5 in any suitable manner. The boom 9 is placed in between the logs and separates the raft into distinct sections and in this way prevents the logs of the raft from becoming jammed. The preventing of the logs from becoming jammed also assists the outer booms 1 1 in that they prevent undue strain upon any one point along the sides of the raft. When it is desired to tow the raft, a suitable chain, as 10, is secured to one of the outer booms 2, and the said boom 2 is connected to the inner system of booms by a suitable chain and eyebolt 11. In constructing this system of booms I preferably make countersunk portions 12 and 13 to accommodate the eyebolt within the log 6. In this manner the log or boom may be connected together or secured to the cross-binders without interfering with the surrounding parts of the boom.

What I claim is—

1. In a device of the class described the combination with a system of booms, of cross-binders, a second system of booms and means for removably securing the same together.

2. In a device of the class described the combination of a system of outer and inner booms, chains for securing the outer booms together, cross-binders for retaining said outer booms in position and a chain and eyebolt secured in said outer boom for holding said cross-binders in place.

3. In a device of the class described the combination of a series of booms, an inner series of booms independent of the outer booms, and cross-binders secured to the inner system of booms for forming sections in a raft.

4. In a device of the class described a system of booms for retaining rafts together, a second system of booms inclosed within said system of booms, retaining cross-binders passing over the logs of the raft secured to said outer system of booms for preventing the logs from climbing over said booms, and a cross-boom secured to the inner system of booms for separating the logs of the raft in distinct sections.

5. In a device of the class described a system of booms for holding rafts together, a second system of booms within said system of booms, and means for securing said systems together when the raft is to be towed.

In testimony whereof I affix my signature in presence of two witnesses.

MICHAEL F. BROWN.

Witnesses:
G. WARD KEMP,
L. C. MASSIE.